(No Model.)

J. W. SEAVOLT.
CARBONATING DEVICE.

No. 573,712. Patented Dec. 22, 1896.

WITNESSES:
Donn Twitchell
Geo. G. Hoskins

INVENTOR
J. W. Seavolt
BY
ATTORNEYS.

THE NORRIS PETERS CO., PHOTO-LITHO., WASHINGTON.

UNITED STATES PATENT OFFICE.

JOHN W. SEAVOLT, OF LOCK 53, MARYLAND, ASSIGNOR OF ONE-FOURTH TO EDMUND P. COHILL, OF HANCOCK, MARYLAND.

CARBONATING DEVICE.

SPECIFICATION forming part of Letters Patent No. 573,712, dated December 22, 1896.

Application filed July 21, 1896. Serial No. 600,001. (No model.)

*To all whom it may concern:*

Be it known that I, JOHN W. SEAVOLT, of Lock 53, in the county of Washington and State of Maryland, have invented a new and Improved Carbonating Device, of which the following is a full, clear, and exact description.

The invention relates to carbonated beverages, such as beer, and contained in kegs, barrels, and like receptacles.

The object of the invention is to provide a new and improved carbonating device or attachment for kegs, barrels, and like receptacles and arranged to automatically discharge carbonic-acid gas into the receptacle as the liquid contents thereof are drawn off, to keep the remaining liquid under pressure of the gas and thereby in perfect condition and without danger of the liquid becoming stale or sour.

The invention consists of a receptacle containing carbonic-acid gas under pressure and a spring-pressed piston arranged to slide in a cylinder in the casing of the receptacle and automatically establish and cut off communication between the receptacle and the keg, barrel, or the like with which it is connected, and the particular arrangement and combination of parts forming the said device will be hereinafter more fully set forth, and particularly pointed out in the claims.

Reference is to be had to the accompanying drawings, forming a part of this specification, in which similar characters of reference indicate corresponding parts in all the figures.

Figure 1:
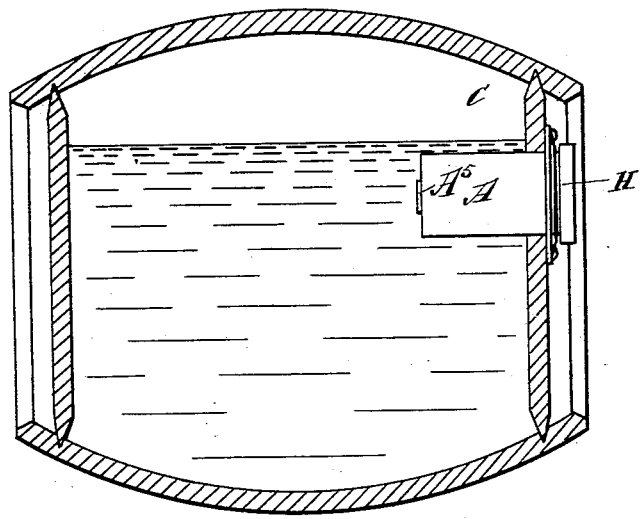
Figure 2:
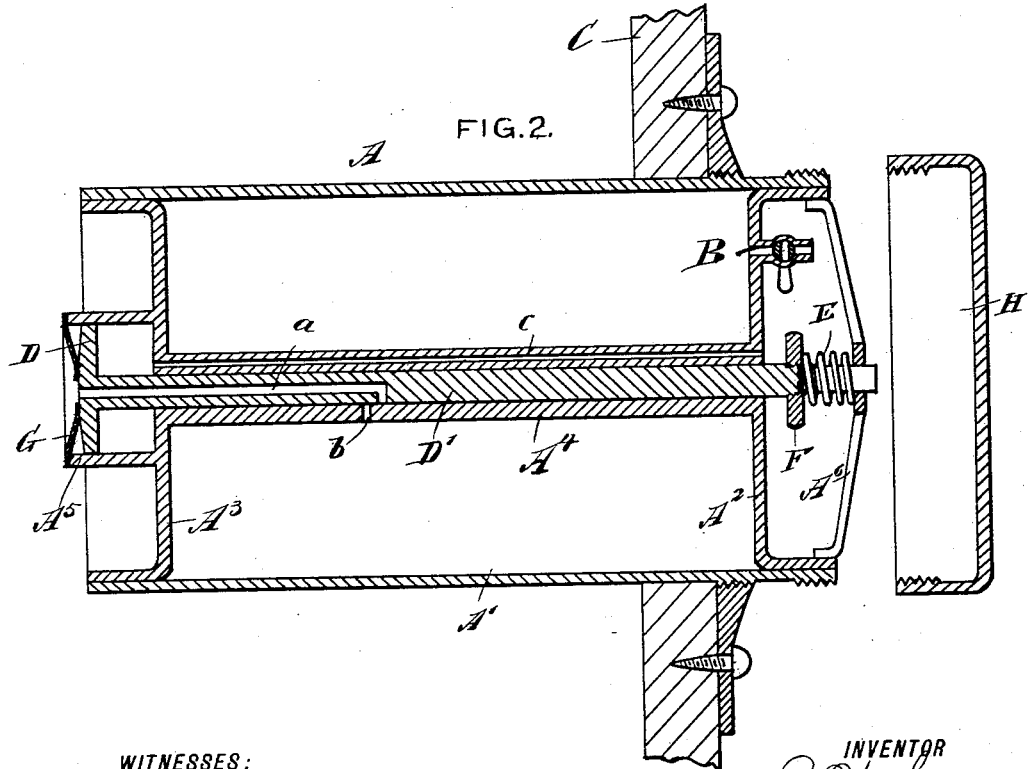

Figure 1 is a side elevation of the improvement as applied, and Fig. 2 is an enlarged sectional side elevation of the same.

The improved carbonating device is provided with a casing A, adapted to be charged or filled with carbonic-acid gas through a suitable filling-valve B. (Indicated in Fig. 2.) The casing A is adapted to be fastened to a suitable part of the barrel, keg, or like receptacle C, so that the casing projects into the interior of the keg, as plainly indicated in the drawings.

The casing A is preferably made with a cylindrical body A', closed at the ends by heads $A^2$ $A^3$, centrally connected with each other by a hollow connecting-rod $A^4$, as is plainly shown in Fig. 2. On the inner head $A^3$ is formed an outwardly-extending cylinder $A^5$, in which operates a piston D, secured on a piston-rod D', fitted to slide in the connecting-rod $A^4$, the outer or forward end of said piston-rod being guided in a spider $A^6$, attached to the head $A^2$. A spring E is coiled on the outer end of the piston-rod D', and said spring rests at one end on said spider $A^6$ and with its other end on a nut F, screwing on the piston-rod D' and serving to adjust the tension of the spring E.

In the piston-rod D' is formed a channel $a$, extending through the piston D to connect with the interior of the receptacle C, said channel being adapted to register at its inner end with a port $b$, formed in the wall of the rod $A^4$ and leading to the interior of the casing to permit the carbonic-acid gas to pass through the port $b$ and the registering channel $a$ into the interior of the receptacle C. The channel $a$ and port $b$ are normally held out of register by the pressure of liquid and gases contained in the keg or receptacle C. The amount of pressure desired in the keg may be regulated by the spring E and nut F.

The connecting-rod $A^4$ is provided with a longitudinal opening $c$, forming a vent which admits air to the cylinder $A^5$ and insures the perfect working of the piston.

Now it is evident that when the device is applied and liquid is withdrawn from the otherwise-closed receptacle C, then the reduced pressure in the latter causes the spring E to force the piston D farther inward, so that the channel $a$ registers with the port $b$. In doing so the carbonic-acid gas can pass from the receptacle C through the said registering port and channel to the interior of the said receptacle C to charge the latter with gas until the pressure in the receptacle attains the pressure to which it is set by the spring. The pressure of the gas in the receptacle now acts on the piston D to cause the latter to move in the opposite direction, back to its former position, and to cut off communication between the channel $a$ and port $b$. This operation is repeated whenever part of the liquid contained in the receptacle C is withdrawn, and consequently the receptacle C is continually charged with gas, so that the remaining liquid is not liable to become sour.

In order to prevent the liquid from having direct contact with the piston D, I may cover the latter with a flexible material G, of canvas or the like. A cap H may be employed for screwing on the outer end of the casing A' to inclose or incase the parts at this end of the casing.

Having thus fully described my invention, I claim as new and desire to secure by Letters Patent—

1. A carbonating device, comprising a casing adapted to contain carbonic-acid gas under pressure, a cylinder held on the inner end of the said casing, and a spring-pressed piston fitted to slide in said cylinder and adapted to connect the interior of the receptacle with the interior of the said casing, substantially as shown and described.

2. A carbonating device, comprising a casing adapted to contain carbonic-acid gas, a cylinder formed on said casing and opening into the receptacle on which the device is to be applied, a piston fitted to slide in said cylinder and having a piston-rod formed with a channel adapted to register with a port leading to the interior of said casing, and a spring pressing on the said piston-rod, substantially as shown and described.

3. A carbonating device, comprising a casing adapted to contain carbonic-acid gas, a cylinder formed on said casing and opening into the receptacle on which the device is to be applied, a piston fitted to slide in said cylinder and having a piston-rod formed with a channel adapted to register with a port leading to the interior of said casing, a spring pressing on said piston-rod, and means for regulating the tension of said spring, substantially as shown and described.

4. A carbonating device, comprising the casing adapted to contain carbonic-acid gas under pressure, and provided with an outwardly-extending cylinder opening into the receptacle on which the device is to be applied, a hollow rod in said casing, and a spring-pressed piston-rod in said hollow rod and having a piston operating in said cylinder, the hollow rod being provided with a port and the piston-rod with a channel extending through the piston and arranged to register with said port, substantially as shown and described.

JOHN W. SEAVOLT.

Witnesses:
BENJ. MITCHELL, Jr.,
ARMSTEAD A. SWINGLE.